(12) United States Patent
Lee (10) Patent No.: US 11,829,018 B2
(45) Date of Patent: Nov. 28, 2023

(54) DEVICE AND METHOD FOR IMPROVING RESPONSE TIME OF LIQUID CRYSTAL DISPLAY PANEL IN LOW TEMPERATURE ENVIRONMENT

(71) Applicant: HYUNDAI MOBIS CO., LTD., Seoul (KR)

(72) Inventor: Jung Young Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/873,251

(22) Filed: Jul. 26, 2022

(65) Prior Publication Data

US 2023/0161188 A1 May 25, 2023

(30) Foreign Application Priority Data

Nov. 24, 2021 (KR) .......................... 10-2021-0163413

(51) Int. Cl.
*G02F 1/1333* (2006.01)
*G02F 1/1337* (2006.01)

(52) U.S. Cl.
CPC .. *G02F 1/133382* (2013.01); *G02F 1/133711* (2013.01)

(58) Field of Classification Search
CPC ...................... G02F 1/133382; G02F 1/133711
See application file for complete search history.

(56) References Cited

U.S. PATENT DOCUMENTS

| 2013/0208198 A1* | 8/2013 | Choi | ................ G02F 1/133602 361/748 |
| 2021/0021014 A1* | 1/2021 | Varel | ................... H01L 27/1218 |
| 2022/0397789 A1* | 12/2022 | Hu | ........................... E06B 9/24 |

FOREIGN PATENT DOCUMENTS

| DE | 4231557 A1 * | 4/1993 | ....... G02F 1/133382 |
| KR | 20180025436 A * | 3/2018 | ............... G09G 3/20 |
| KR | 20190073963 A * | 6/2019 | ........... G02F 1/1333 |
| KR | 20190073963 A | 6/2019 | |
| WO | WO-9309524 A1 * | 5/1993 | ............. E01F 9/615 |
| WO | WO-2010016614 A1 * | 2/2010 | ....... G02F 1/133382 |

OTHER PUBLICATIONS

English Machine Translation of KR20190073963 (Year: 2023).*
English Machine Translation of KR 20180025436 (Year: 2023).*
English Machine Translation of DE 4231557 (Year: 2023).*

* cited by examiner

*Primary Examiner* — Donald L Raleigh
(74) *Attorney, Agent, or Firm* — Novo TechIP International PLLC (57) ABSTRACT

The present invention relates the quality of a display device by implementing a function capable of increasing the response time of the liquid crystal in the low temperature environment by preventing deterioration in visibility on a panel surface and applying a structure capable of generating heat.

3 Claims, 8 Drawing Sheets

DEVICE AND METHOD FOR IMPROVING RESPONSE TIME OF LIQUID CRYSTAL DISPLAY PANEL IN LOW TEMPERATURE ENVIRONMENT

CROSS-REFERENCE TO RELATED APPLICATIONS

This application claims the benefit of priority to Korean Patent Application No. 10-2021-0163413, filed on Nov. 24, 2021, the disclosure of which is incorporated herein by reference in its entirety.

BACKGROUND

1. Technical Field

The present invention relates to a display device, and more particularly, to a device for improving a response time of a liquid crystal display (LCD) panel in a low temperature environment which can prevent the response time of a display from being significantly reduced in a low temperature environment.

2. Discussion of Related Art

The application of a liquid crystal display (LCD) to an automobile cluster and a center infotainment display (CID) is increasing.

The LCD is based on liquid crystal driving and has an operating characteristic that a response time is significantly reduced at a low temperature due to its physical properties.

For example, in liquid crystal response characteristics of a conventional LCD for vehicles, it can be seen that the response time is 20 milliseconds (ms) at an external temperature of 20 degrees and is 150 ms at −20 degrees, which is 7 times slower than 20 degrees, and is 400 ms at −30 degrees, which is 20 times slower than 20 degrees.

Accordingly, in the conventional LCD, the decrease in the response time of the liquid crystal at low temperature causes drag of an image to be displayed, the image cannot be displayed in real time, and the image display may be delayed, which may cause a decrease in the driver's reaction in a low temperature environment.

Example) In a low temperature environment, the image display of a cluster LCD warning light, side mirror/rear cameras, and the like may be delayed by 0.4 seconds or more.

SUMMARY

The present invention is directed to solving problems of the related art, and is directed to providing a device for improving a response time of a liquid crystal display (LCD) panel in a low temperature environment that can improve the safety of a driver and the quality of a display device by implementing a function capable of increasing the response time of the liquid crystal in the low temperature environment by preventing deterioration in visibility on a panel surface and applying a structure capable of generating heat.

Objects of the present invention are not limited to the objects mentioned above, and other objects not mentioned above will be clearly understood by those skilled in the art from the following description.

According to an aspect of the present invention for achieving the above objects, a device for improving the response time of a liquid crystal display panel in a low temperature environment includes: a liquid crystal display panel including liquid crystals that are in an intermediate state between a liquid and a solid; a resistance film for controlling heat generation provided on an upper surface of the liquid crystal display panel and having conductivity; a power supply unit that supplies a constant current to the resistance film for controlling heat generation so as to heat the resistance film for controlling heat generation; and a control unit that detects a temperature of the liquid crystal display panel through a sensor and controls an amount of current supplied to the resistance film for controlling heat generation through the power supply unit when the detected temperature of the liquid crystal display panel rises above a predetermined temperature.

The resistance film for controlling heat generation may be a transparent film with a planar shape.

The resistance film for controlling heat generation may have a resistance value equal to or greater than k ohm.

The device may further include a resistance film for blocking an electric field that is provided between the liquid crystal display panel and the resistance film for controlling heat generation, has one side thereof connected to the ground, and shields an electric field generated by the resistance film for controlling heat generation from affecting the liquid crystal display panel.

The resistance film for blocking an electric field may have a sheet resistance value lower than that of the resistance film for controlling heat generation.

In the resistance film for controlling heat generation, a plurality of resistance bars may be formed at regular intervals.

The resistance bars of the resistive film for controlling heat generation may be disposed to match a pixel spacing of the liquid crystal display panel.

The resistance bars of the resistance film for controlling heat generation may be provided in units of a plurality of pixel columns of the liquid crystal display panel.

The resistance bars of the resistance film for controlling heat generation may include first resistance bars connected to the power supply unit and second resistance bars not connected to the power supply unit.

When controlling the resistance film for controlling heat generation through the power supply unit, the control unit may be in association with a driving timing of the liquid crystal display panel, and when driving one frame of an image output through the liquid crystal display panel, the control unit may drive the liquid crystal display panel and the resistance film for controlling heat generation separately in time.

The control unit may automatically control the resistance film for controlling heat generation by using a switch for switching on/off and a temperature sensor to improve the response time of the liquid crystal display panel.

When a response time improvement function of the liquid crystal display panel is set to ON, the control unit may collect temperature information of the liquid crystal display panel 100 collected by the temperature sensor and determine whether the collected temperature of the liquid crystal display panel is less than or equal to a preset temperature to control driving of the power supply unit.

A method of improving a response time of a liquid crystal display panel in a low temperature environment according to an exemplary embodiment of the present invention includes operations of: determining whether a response time improvement function of the liquid crystal display panel is set to ON by a control unit; determining whether an automatic mode is set when the response time improvement function is set to ON in the operation of determining whether the response speed improvement function of the liquid crystal display panel is set to ON; collecting temperature information of the liquid crystal display panel collected by a temperature sensor; determining whether the collected temperature of the liquid crystal display panel is less than or equal to a preset temperature; and driving the power supply unit to heat the resistance film for controlling heat generation by the control unit when a manual mode (ON) is set in the operation of determining whether the automatic mode is set, or the collected temperature of the liquid crystal display panel is less than or equal to the preset temperature.

When the response time improvement function is set to OFF in the determining operation, the method may include turning off an operation of a response time improvement driving circuit.

The above-described configurations and operations of the present invention will become more apparent from embodiments described in detail below with reference to the drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Advantages and features of the present invention and methods for achieving them will be made clear from embodiments described in detail below with reference to the accompanying drawings. However, the present invention may be embodied in many different forms and should not be construed as being limited to the embodiments set forth herein. Rather, these embodiments are provided so that this disclosure will be thorough and complete and will fully convey the scope of the present invention to those of ordinary skill in the technical field to which the present invention pertains. The present invention is defined by the claims. Meanwhile, terms used herein are for the purpose of describing the embodiments and are not intended to limit the present invention. As used herein, the singular forms include the plural forms as well unless the context clearly indicates otherwise. The term "comprise" or "comprising" used herein does not preclude the presence or addition of one or more other elements, steps, operations, and/or devices other than stated elements, steps, operations, and/or devices.

Figure 1:
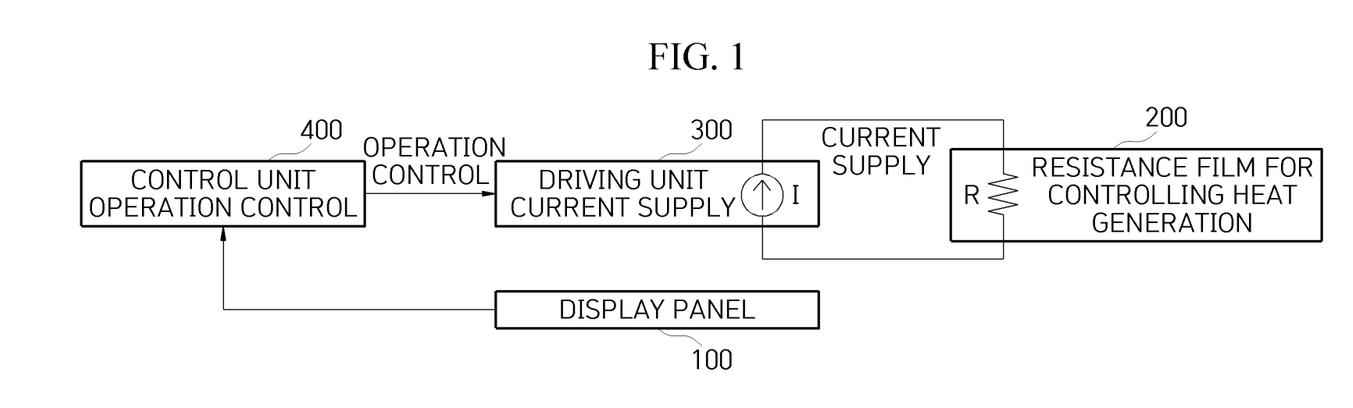
FIG. 1 is a block diagram for describing a device for improving a response time of a liquid crystal display (LCD) panel in a low temperature environment according to an exemplary embodiment of the present invention.

FIG. 1 is a block diagram for describing a device for improving a response time of a liquid crystal display panel in a low temperature environment according to an exemplary embodiment of the present invention.

As shown in FIG. 1, the device for improving the response time of the liquid crystal display (LCD) panel in the low temperature environment according to an exemplary embodiment of the present invention includes a liquid crystal display panel 100, a resistance film for controlling heat generation (i.e., first resistance film) 200, a power supply unit 300, and a control unit 400.

The liquid crystal display panel 100 is in an intermediate state between a liquid and a solid and has positive (+) and negative (−) polarities. Such a liquid crystal display panel becomes closer to a solid in a low temperature environment of −30° C. or −20° C., and accordingly, a rotation speed of a liquid crystal is significantly reduced, and the liquid crystal display panel liquefies as it goes to a high temperature environment such as 90° C., 100° C. and the like. At this point, the liquid crystal display panel loses polarity thereof and thus does not react to an electric field.

Figure 2A:
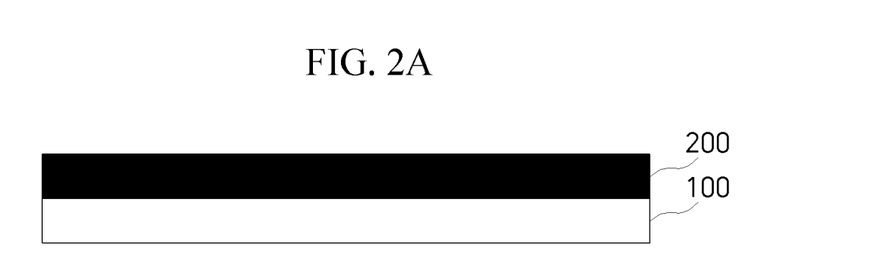
FIG. 2A is a reference diagram for describing a formation structure of the liquid crystal display panel and a resistance film for controlling heat generation of FIG. 1.
Figure 2B:
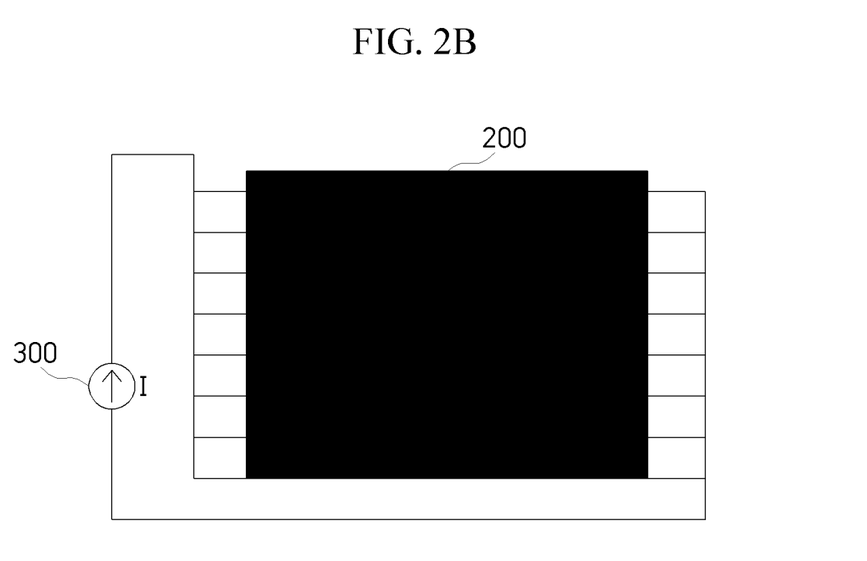
FIG. 2B is a reference diagram for describing the connection of the resistance film for controlling heat generation and a power supply unit of FIG. 1.

As shown in FIG. 2A, the resistance film for controlling heat generation 200 is provided on an upper surface of the liquid crystal display panel 100 or an upper surface of a cover window and is a transparent film having conductivity. As shown in FIG. 2B, the resistance film for controlling heat generation 200 is a film having a surface shape and a high sheet resistance value, and the sheet resistance value may be equal to or greater than a resistance value (k ohm) capable of generating heat in proportion to a supplied current.

The power supply unit 300 supplies a constant current to the resistance film for controlling heat generation 200 so that the resistance film for controlling heat generation 200 may generate heat. An amount of heat provided by the resistance film for controlling heat generation 200 may be calculated by multiplying the square of the current by the resistance and time.

The control unit 400 detects a temperature of the liquid crystal display panel 100 through a sensor and controls an amount of current supplied to the resistance film for controlling heat generation 200 through the power supply unit 300 when the detected temperature of the liquid crystal display panel 100 rises above a predetermined temperature.

According to the exemplary embodiment of the present invention, there is an effect that problems such as image blurring
and afterimages in a low temperature environment may be improved.

In addition, according to the exemplary embodiment of the present invention, there is an effect that a delay time of a warning display, a rear/side image display, or the like is shortened by the improvement of the response time, which may contribute to safety.

Further, according to the exemplary embodiment of the present invention, there is an effect that the commercial value may be improved by adding a differentiating function.

Figure 3:
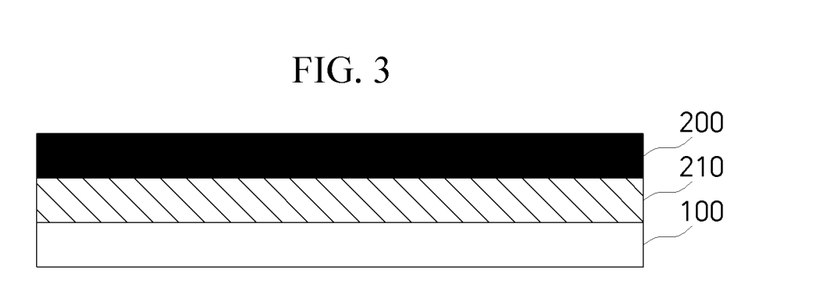
FIG. 3 is a cross-sectional view for describing a cross-sectional laminated structure of a device for improving a response time of a liquid crystal display panel in a low temperature environment according to another exemplary embodiment of the present invention.
Figure 4:
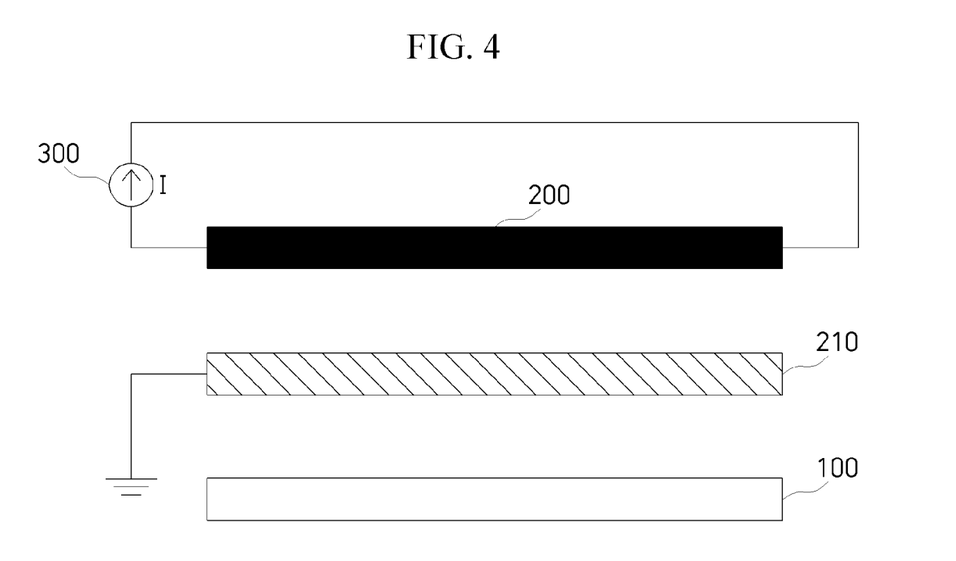
FIG. 4 is a reference diagram for describing a signal connection structure of the device for improving the response time of the liquid crystal display panel in the low temperature environment according to another exemplary embodiment of the present invention.

FIG. 3 is a cross-sectional view for describing a cross-sectional laminated structure of a device for improving a response time of a liquid crystal display panel in a low temperature environment according to another exemplary embodiment of the present invention, and FIG. 4 is a reference diagram for describing a signal connection structure of the device for improving the response time of the liquid crystal display panel in the low temperature environment according to another exemplary embodiment of the present invention.

As shown in FIG. 3, the device for improving the response time of the liquid crystal display panel in the low temperature environment according to the exemplary embodiment of the present invention includes a liquid crystal display panel 100, a resistance film for controlling heat generation 200, a power supply unit 300, and a control unit 400, and further include a resistance film for blocking an electric field (i.e., second resistance film) 210.

The liquid crystal display panel 100 is in an intermediate state between a liquid and a solid and has positive (+) and negative (−) polarities. Such a liquid crystal display panel becomes closer to a solid in a low temperature environment of −30° C. or −20° C., and accordingly, a rotation speed of a liquid crystal is significantly reduced, and the liquid crystal display panel liquefies as it goes to a high temperature environment such as 90° C., 100° C., and the like. At this point, the liquid crystal display panel loses polarity thereof and thus does not react to an electric field.

The resistance film for controlling heat generation 200 is provided on an upper surface of the liquid crystal display panel 100 or an upper surface of a cover window and is a transparent film having conductivity. The resistance film for controlling heat generation 200 is a film having a high sheet resistance value, and the sheet resistance value may be equal to or greater than a resistance value (k ohm) capable of generating heat in proportion to a supplied current.

As shown in FIG. 4, the resistance film for blocking an electric field 210 is provided between the liquid crystal display panel 100 and the resistance film for controlling heat generation 200 and one side thereof is connected to the ground, has a sheet resistance value lower than that of the resistance film for controlling heat generation 200, and shields an electric field generated by the resistance film for controlling heat generation 200 from affecting the liquid crystal display panel 100. The resistance film for blocking an electric field 210 may usually have a sheet resistance value of 0 ohm to several hundred ohms.

The power supply unit 300 supplies a constant current to the resistance film for controlling heat generation 200 so that the resistance film for controlling heat generation 200 may generate heat. An amount of heat provided by the resistance film for controlling heat generation 200 may be calculated by multiplying the square of the current by the resistance and time.

The control unit 400 detects a temperature of the liquid crystal display panel 100 through a sensor and controls an amount of current supplied to the resistance film for controlling heat generation 200 through the power supply unit 300 when the detected temperature of the liquid crystal display panel 100 rises above a predetermined temperature.

According to another exemplary embodiment of the present invention, there is an effect that problems such as image blurring and afterimages in a low temperature environment may be improved.

In addition, according to another exemplary embodiment of the present invention, there is an effect that a delay time of a warning display, a rear/side image display, or the like is shortened by the improvement of the response time, which may contribute to safety.

Further, according to another exemplary embodiment of the present invention, the temperature of the display panel is raised through the resistance film for controlling heat generation to operate normally, and the electric field generated by the resistance film does not affect the display panel, so that there is an effect that it is possible to secure the stability of the display panel.

Figure 5:
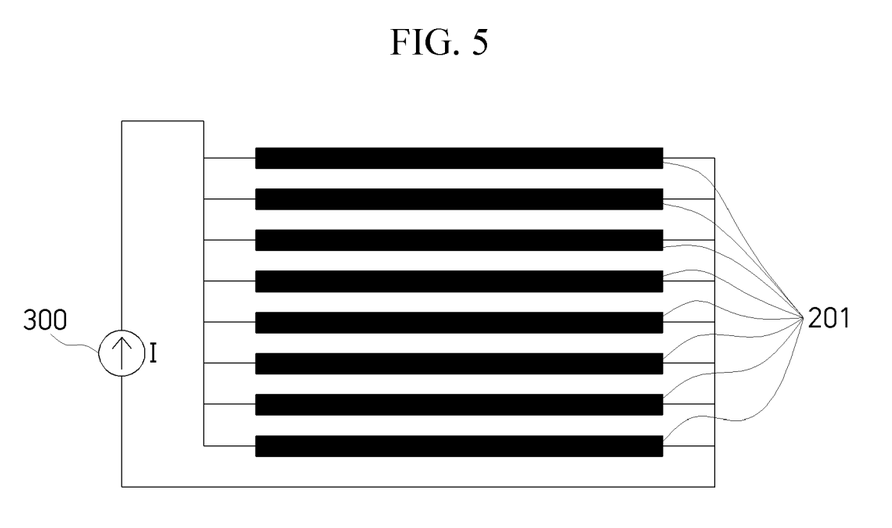
FIG. 5 is a view for describing a resistance film for controlling heat generation of another example in another exemplary embodiment of the present invention.

Meanwhile, the resistance film for controlling heat generation 200 in an exemplary embodiment of the present invention may have a planar shape that may include the liquid crystal display panel 100, but the resistance film for controlling heat generation 200 in FIG. 5 in another exemplary embodiment of the present invention may be formed in plural with resistance bars 201 which are not in a planar shape at regular intervals.

Through this, in still another exemplary embodiment of the present invention, since an area and resistance value of the resistance film for controlling heat generation may be increased, there is an effect that the display panel may operate stably while utilizing a low current.

Figure 6:
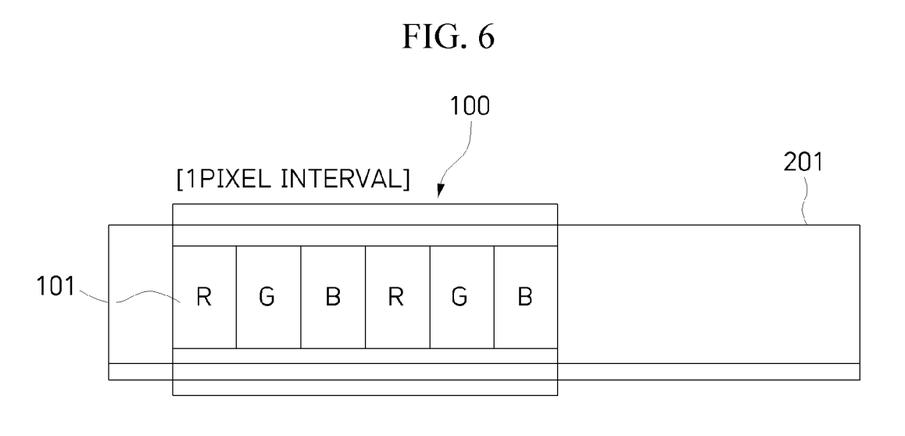
FIG. 6 is a reference view for describing an example in which the heat control resistive film of FIG. 5 is installed on the liquid crystal display panel.

As shown in FIG. 6, the resistance bar 201 of the resistance film for controlling heat generation 200 may be disposed in accordance with a spacing of pixels 101 of the LCD. That is, the liquid crystal display panel 100 has an opaque section because an opaque metal wiring provided in the LCD passes through, and when the resistance film is positioned so as to overlap the metal wiring, it is possible to prevent the visibility from being deteriorated. That is, the linear resistance bar 201 is designed at a pitch interval of the pixels of the liquid crystal display panel 100, and the resistance bar 201 is laminated to align with the liquid crystal display panel 100.

Figure 7:
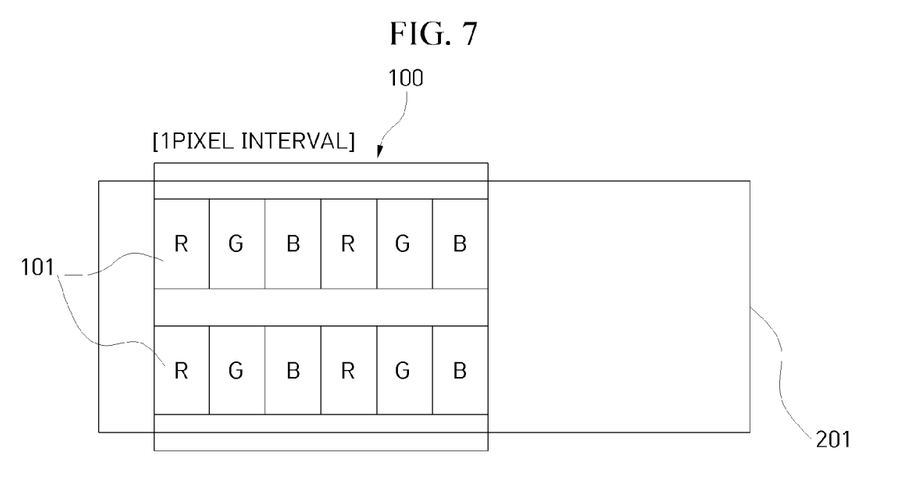
FIG. 7 is a reference view for describing another example in which the heat control resistive film of FIG. 5 is installed on the liquid crystal display panel.

As shown in FIG. 7, the resistance bar 201 of the resistance film for controlling heat generation 200 according to yet another exemplary embodiment of the present invention may be provided in units of a plurality of pixels, for example, two pixels or three pixels by changing a thickness of the wiring.

Figure 8:
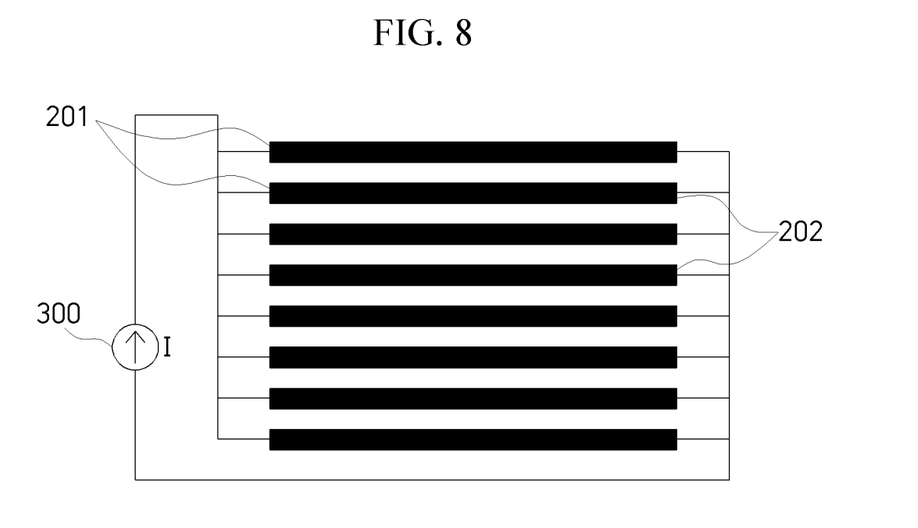
FIG. 8 is a reference diagram for describing an example of a connection between a bar resistance of a resistance film for controlling heat generation and a power supply unit in a device for improving a response time of a liquid crystal display panel in a low temperature environment according to another exemplary embodiment of the present invention.

In addition, the resistance bar 201 of the resistance film for controlling heat generation 200 according to another exemplary embodiment of the present invention has a structure in which all the resistance bars 201 are connected to the power supply unit 300, but in still another exemplary embodiment, as in another exemplary embodiment, the resistance bars 201 are arranged without supplying power to all the resistance bars 201, and as shown in FIG. 8, the resistance bars 201 are composed of a first resistance bar 201 connected to the power supply unit 300 and a second resistance bar 202 not connected to the power supply unit 300, so that there is an effect that it is possible to reduce the power consumption required for driving.

Meanwhile, when controlling the resistance film for controlling heat generation 200 through the power supply unit 300, the control unit 400 operates in association with a drive timing of the liquid crystal display panel 100.

Figure 9:
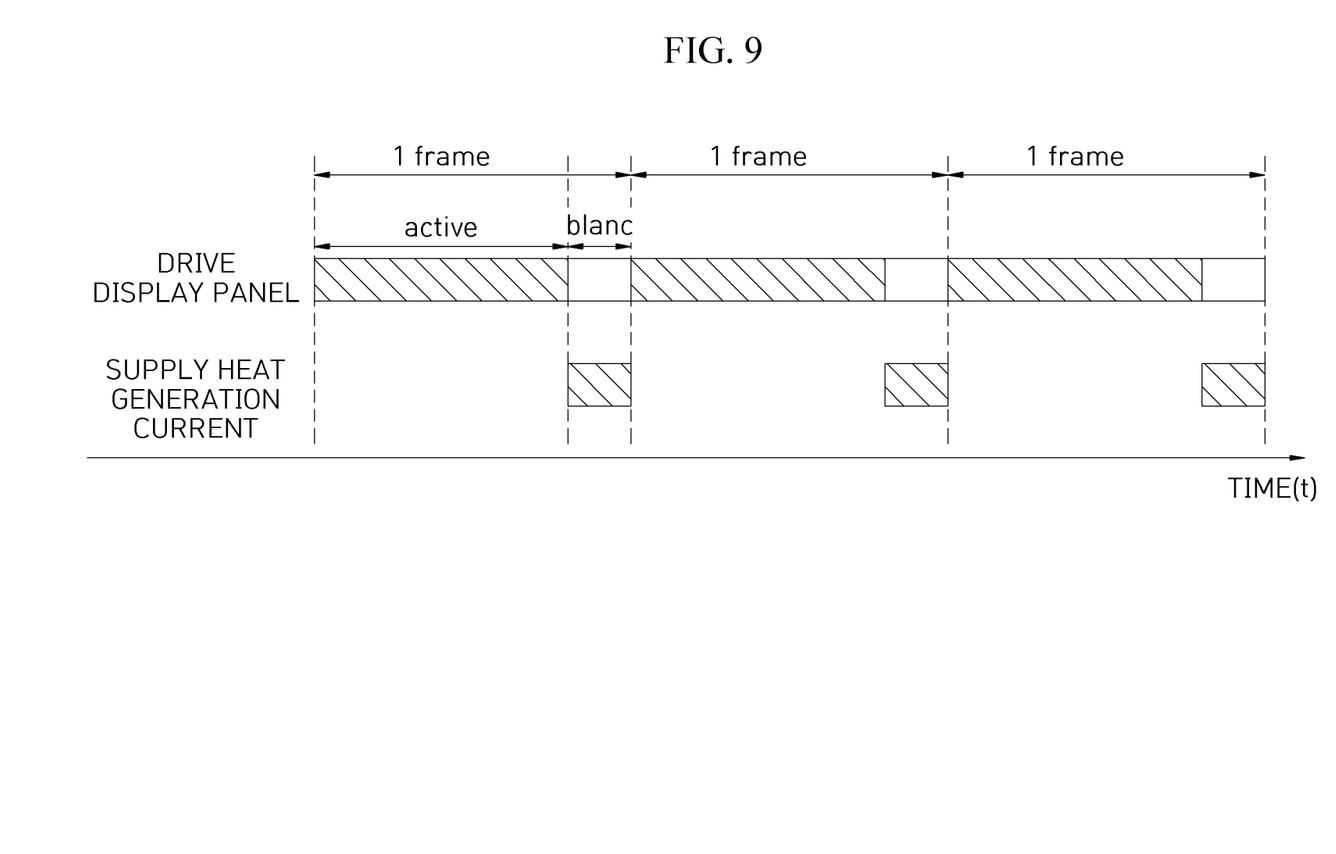
FIG. 9 is a reference diagram for describing signal control of a liquid crystal display panel and a resistance film for controlling heat generation in an exemplary embodiment of the present invention.

As shown in FIG. 9, the control unit 400 according to an exemplary embodiment of the present invention drives the liquid crystal display panel 100 and the resistance film for controlling heat generation 200 separately in time when driving one frame, so that there is an effect that it is possible to prevent the display panel from malfunctioning due to unnecessary electric field interference.

Meanwhile, in an exemplary embodiment of the present invention, in order to improve the response time of the liquid crystal display panel 100, the control unit 400 may also automatically control the resistance film for controlling heat generation 200 by using a switch (not shown) for switching on/off or selectively supply the current to the resistance film 200 and a temperature sensor.

Here, a temperature threshold point of the liquid crystal display panel 100 may be set by a manufacturer, and it is possible to change the setting in consideration of the liquid crystal operating characteristics of the applied LCD.

As described above, when the temperature of the liquid crystal display panel 100 is too high, the characteristics of the liquid crystal are lost, and thus the control unit 400 may continuously monitor a timer or the temperature of the display to control the temperature as shown in [Table 1].

TABLE 1

| Function of improving response time (switch) | Automatic mode (switch) | Check temperature of display (sensor) | Operation of improving response time at low temperature |
|---|---|---|---|
| OFF | N/A | N/A | OF |
| ON | OFF | N/A | ON |
| ON | ON | BELOW SET TEMPERATURE | ON |
| ON | ON | ABOVE SET TEMPERATURE | OFF |

According to an exemplary embodiment of the present invention, there is an effect of having a film laminated structure that does not affect the LCD while applying the heat-generating film, an area reduction structure of the resistance film, a visibility degradation prevention structure while disposing a linear shape rather than a plane shape, and a low power connection structure.

Figure 10:
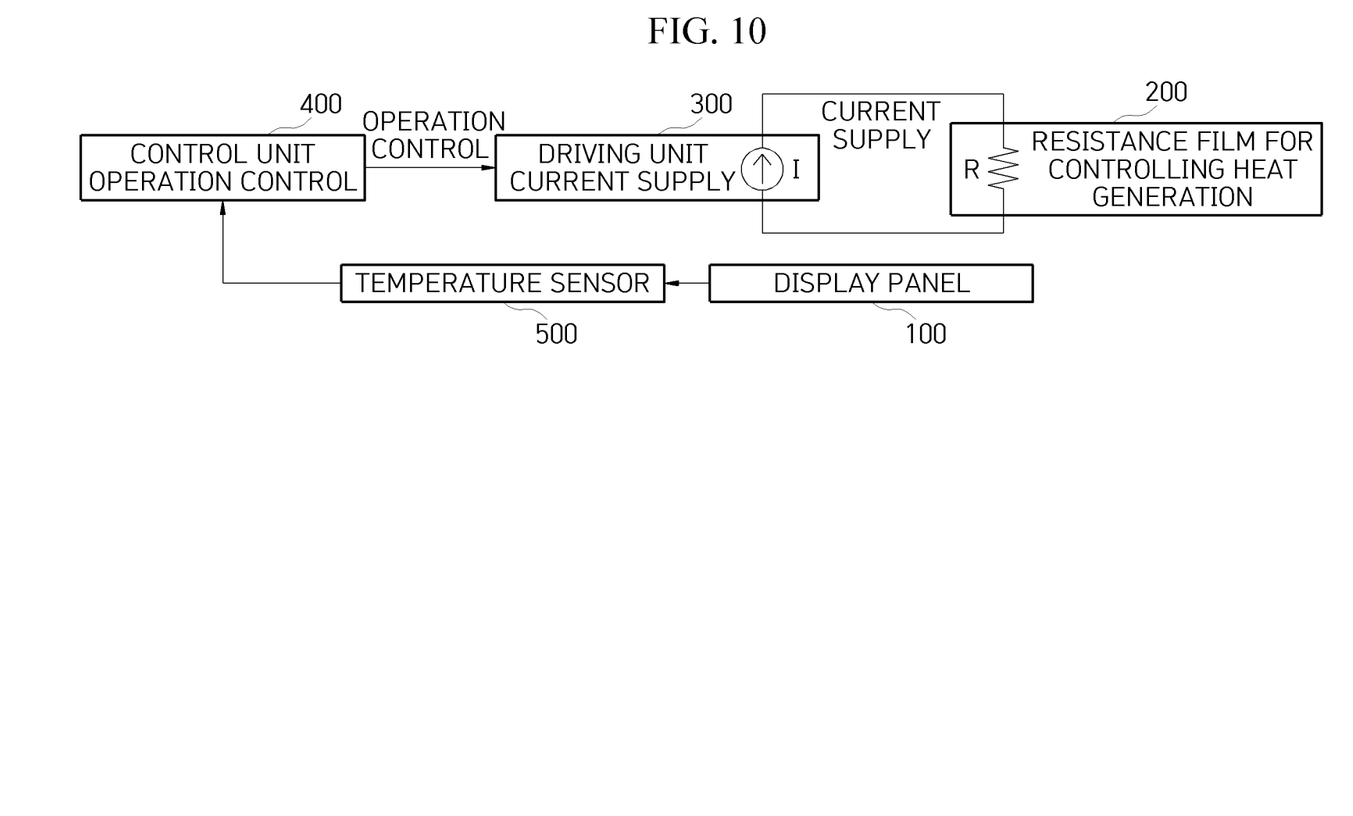
FIG. 10 is a block diagram for describing a device for improving a response time of a liquid crystal display panel in a low temperature environment according to still another exemplary embodiment of the present invention.

FIG. 10 is a functional block diagram for describing a device for improving a response time of a liquid crystal display panel in a low temperature environment according to still another exemplary embodiment of the present invention.

As shown in FIG. 10, the device for improving a response time of the liquid crystal display panel in the low temperature environment according to the exemplary embodiment of the present invention includes a liquid crystal liquid crystal display panel 100, a temperature sensor 110, a resistance film for controlling heat generation 200, a power supply unit 300, and a control unit 400.

The liquid crystal display panel 100 is in an intermediate state between a liquid and a solid and has positive (+) and negative (−) polarities. Such a liquid crystal display panel becomes closer to a solid in a low temperature environment of −30° C. or −20° C., and accordingly, a rotation speed of a liquid crystal is significantly reduced, and the liquid crystal display panel liquefies as it goes to a high temperature environment such as 90° C., 100° C. and the like. At this point, the liquid crystal display panel loses polarity thereof and thus does not react to an electric field.

The temperature sensor 110 measures the temperature of the liquid crystal display panel 100.

As shown in FIG. 2, the resistance film for controlling heat generation 200 is provided on an upper surface of the liquid crystal display panel 100 or an upper surface of a cover window and is a transparent film having conductivity. The resistance film for controlling heat generation 200 is a film having a surface shape and a high sheet resistance value, and the sheet resistance value may be equal to or greater than a resistance value (k ohm) capable of generating heat in proportion to a supplied current.

The power supply unit 300 supplies a constant current to the resistance film for controlling heat generation 200 so that the resistance film for controlling heat generation 200 may generate heat. An amount of heat provided by the resistance film for controlling heat generation 200 may be calculated by multiplying the square of the current by the resistance and time.

The control unit 400 detects a temperature of the liquid crystal display panel 100 through a sensor and controls an amount of current supplied to the resistance film for controlling heat generation 200 through the power supply unit 300 when the detected temperature of the liquid crystal display panel 100 rises above a predetermined temperature.

According to an exemplary embodiment of the present invention, there is an effect that problems such as image blurring and afterimages in a low temperature environment can be improved.

In addition, according to an exemplary embodiment of the present invention, there is an effect that a delay time of a warning display, a rear/side image display, or the like is shortened by the improvement of the response time, which can contribute to safety.

Further, according to an exemplary embodiment of the present invention, there is an effect that the commercial value may be improved by adding a differentiating function.

Figure 11:
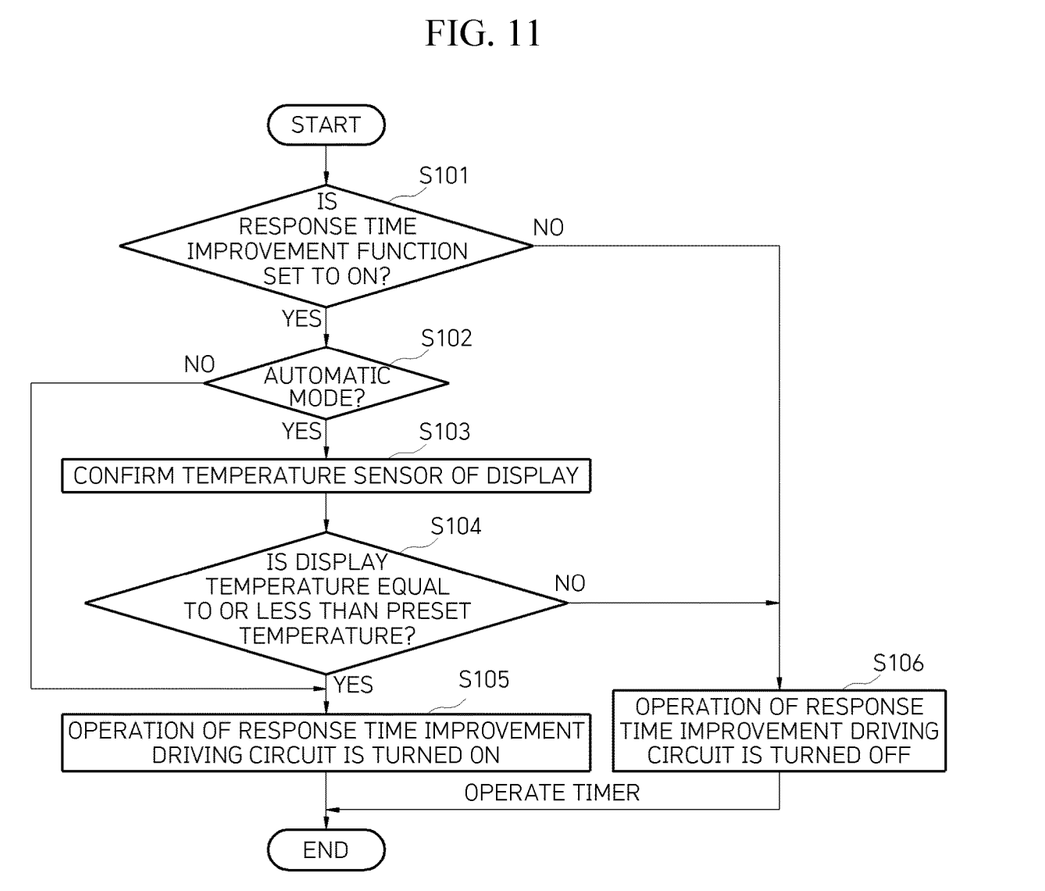
FIG. 11 is a flowchart for describing a method of automatically controlling heat generation in a device for improving a response time of a liquid crystal display panel in a low temperature environment according to an exemplary embodiment of the present invention.

Hereinafter, a method of automatically controlling heat generation in a device for improving a response time of a liquid crystal display panel in a low temperature environment according to still another exemplary embodiment of the present invention will be described with reference to FIG. 11.

A control unit 400 determines whether a response time improvement function of a liquid crystal display panel 100 is set to ON in operation S101.

When the response time improvement function is set to ON (YES), the control unit 400 determines whether an automatic mode is set in operation S102.

Thereafter, the control unit 400 collects temperature information of the liquid crystal display panel 100 collected by a temperature sensor 110 in operation S103.

Subsequently, it is determined whether the collected temperature of the liquid crystal display panel 100 is equal to or less than a preset temperature in operation S104.

When a manual mode is set (NO) in operation S102 for determining whether the automatic mode is set, or the collected temperature of the liquid crystal display panel 100 is equal to or less than the predetermined temperature (YES), the control unit 400 drives a power supply unit 300 to heat a resistance film for controlling heat generation 200 so as to improve the response time of the display panel 400 in operation S105.

On the other hand, when the response time improvement function is set to OFF (NO), an operation of a response time improvement driving circuit is turned off in operation S106.

According to an exemplary embodiment of the present invention, there is an effect that problems such as image blurring and afterimage in a low temperature environment can be improved.

In addition, according to an exemplary embodiment of the present invention, there is an effect that a delay time of a warning display, a rear/side image display, or the like is shortened by the improvement of the response time, which can contribute to safety.

Further, according to an exemplary embodiment of the present invention, there is an effect that the commercial value can be improved by adding a differentiating function.

Although the configuration of the present invention has been described in detail with reference to the accompanying drawings, this is merely an example, Of course, various modifications and changes are possible within the scope of the technical spirit of the present invention by those skilled in the art to which the present invention pertains. Therefore, the scope of protection of the present invention should not be limited to the above-described exemplary embodiments and should be defined by the description of the following claims.

What is claimed is:

1. A device for improving a response time of a liquid crystal display (LCD) panel in a low temperature environment, the device comprising:
    an LCD panel including liquid crystals in an intermediate state between a liquid state and a solid state;
    a first resistance film that is conductive and configured to control heat generation at an upper surface of the LCD panel;
    a power supply unit configured to supply a current to the first resistance film such that the first resistance film controls the heat generation at the upper surface of the LCD; and
    a control configured to:
        receive, from a temperature sensor, a temperature of the LCD panel; and
        control an amount of current supplied to the first resistance film from the power supply unit when the received temperature of the LCD panel meets a predetermined temperature condition,
    wherein the control unit is further configured to:
        operate based on a driving timing of the LCD panel when controlling the amount of current supplied to the first resistance film; and
        drive the LCD panel and the first resistance film with two different driving timings, respectively.

2. A method of operating a device for improving a response time of a liquid crystal display (LCD) panel in a low temperature environment, the device comprising (1) a resistance film configured to control heat generation at an upper surface of the LCD panel, and (2) a power supply unit configured to supply a current to the resistance film such that the resistance film controls the heat generation at the upper surface of the LCD, the method comprising:
    detecting whether an LCD response time improvement function is activated;
    in response to detecting that the LCD response time improvement function is activated, detecting whether an automatic heat generation control mode is activated;
    in response to detecting that the automatic heat generation control mode is activated, receiving, from a temperature sensor, a temperature of the LCD panel; and
    controlling an amount of current supplied to the resistance film from the power supply unit when the received temperature of the LCD panel meets a predetermined temperature condition,
    wherein controlling the amount of current supplied to the resistance film comprises driving the LCD panel and the resistance film with two different driving timings, respectively.

3. The method of claim 2, further comprising:
    detecting that the LCD response time improvement function is deactivated; and
    in response to detecting that the LCD response time improvement function is deactivated, stopping (1) receiving the temperature of the LCD panel and (2) controlling the amount of current supplied to the resistance film.

* * * * *